(12) United States Patent
Ramamoorthy

(10) Patent No.: US 9,132,826 B2
(45) Date of Patent: Sep. 15, 2015

(54) ENERGY CAPTURE MECHANISM FOR ELECTRIC DRIVE MACHINES

(71) Applicant: Caterpillar Inc., Peoria, IL (US)

(72) Inventor: Krishnakumar Ramamoorthy, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 5 days.

(21) Appl. No.: 14/026,210

(22) Filed: Sep. 13, 2013

(65) Prior Publication Data

US 2015/0080178 A1 Mar. 19, 2015

(51) Int. Cl.
*F16H 3/44* (2006.01)
*B60W 10/10* (2012.01)
*B60W 10/02* (2006.01)
*B60W 10/04* (2006.01)
*B60W 10/30* (2006.01)

(52) U.S. Cl.
CPC .............. *B60W 10/10* (2013.01); *B60W 10/02* (2013.01); *B60W 10/04* (2013.01); *B60W 10/30* (2013.01)

(58) Field of Classification Search
USPC .......................................... 475/5, 8, 297, 331
See application file for complete search history.

(56) References Cited

U.S. PATENT DOCUMENTS

| 5,132,604 | A | 7/1992 | Shimane et al. |
| 5,788,597 | A | 8/1998 | Boll et al. |
| 5,791,427 | A | 8/1998 | Yamaguchi |
| 7,379,797 | B2 | 5/2008 | Nasr et al. |
| 8,122,991 | B2 | 2/2012 | Roth |
| 8,622,865 | B2 * | 1/2014 | Su .................................. 475/151 |
| 2012/0312122 | A1 | 12/2012 | Miller et al. |
| 2013/0090202 | A1 * | 4/2013 | Hiraiwa ........................... 475/5 |
| 2013/0267378 | A1 * | 10/2013 | Hiraiwa ........................... 477/5 |

* cited by examiner

*Primary Examiner* — Edwin A Young
(74) *Attorney, Agent, or Firm* — BakerHostetler

(57) ABSTRACT

The present disclosure relates generally to an energy capture for an electric drive machine, and more particularly to systems and methods for capturing energy during braking of the electric drive machine. In some examples, the disclosure describes an energy capture device including at least two planetary gear assemblies. The first planetary gear assembly can be operatively coupled to an engine, and can engage and disengage, via a first overrunning clutch, a shaft coupled to a generator. The second planetary gear assembly can be at least partially fixed to the first planetary gear assembly, and can engage and disengage, via a second overrunning clutch, the shaft. The first overrunning clutch can disengage the shaft and the second overrunning clutch can engage the shaft during a braking period.

20 Claims, 2 Drawing Sheets

ENERGY CAPTURE MECHANISM FOR ELECTRIC DRIVE MACHINES

TECHNICAL FIELD

The present disclosure relates generally to an energy capture for an electric drive machine, and more particularly to systems and methods for capturing energy during braking of the electric drive machine.

BACKGROUND

An electric drive can be used as source of driving power in a machine or vehicle, such as, for example, an off-road work machine, a highway truck, or an automobile. An electric drive can supplement the driving power provided by an internal combustion engine or the electric drive can provide all of the driving power for the vehicle. Using an electric drive to supplement or replace the internal combustion engine can reduce the emissions generated during the operation of the vehicle. In addition, the electric drive can increase the fuel efficiency of the vehicle.

An electric drive typically includes a source of electrical power and an electric motor that is connected to one or more ground engaging devices on the vehicle. The source of electrical power, which can be, for example, a battery or an engine, provides the power that is used to operate the electric motor to generate an output torque. The output torque is transferred to the ground engaging devices on the vehicle to propel the vehicle.

Though electric drive technology contributes to improved fuel efficiency, there is no cost effective way to capture the energy while braking and reusing it to drive the machine. The energy can be captured electrochemically in batteries and reused.

U.S. Pat. No. 8,122,991 ('991 patent), titled "Drivetrain, hybrid vehicle, and operating methods therefor," purports to address improved fuel efficiency for hybrid electric drive vehicles. The '991 patent teaches a drivetrain for a hybrid vehicle with an electrical energy store, which is implemented as a flywheel mass accumulator having a second electric machine. The flywheel mass accumulator is able to be mechanically coupled, via a separate clutch, to an internal combustion engine. The flywheel mass accumulator also is mechanically chargeable and dischargeable. A flywheel mass accumulator provides wear-free energy storage at high energy density in relation to the batteries which are typically used. The losses upon the conversion of mechanical into electrical energy and vice versa are thus dispensed with. The design of the '991 patent, however, does not teach planetary gearing and/or over running clutches to facilitate high-speed energy generation during braking. Accordingly, there is a need for improved fuel efficiency of electric driven machines during braking.

SUMMARY

In some examples, the disclosure describes an energy capture device including at least two overrunning clutches. The first overrunning clutch can be operatively coupled to an engine, and can engage and/or disengage a shaft coupled to a generator. The second overrunning clutch can be adapted to engage and/or disengage the shaft; and can be at least partially fixed to the first overrunning clutch. During braking of the machine, the first overrunning clutch disengages the shaft and the second overrunning clutch engages the shaft.

In some examples, the disclosure describes an energy capture system including at least two sets of planetary gears. The first set of planetary gears can include a first sun gear, a first carrier gear, and a first ring gear. The first set of planetary gears can selectively engage a shaft coupled to a generator. The second set of planetary gears can include a second sun gear, a second carrier gear, and a second ring gear, and can also selectively engage the shaft coupled to the generator. The first sun gear can be fixedly coupled to the second carrier gear.

In some examples, the disclosure describes a machine including an engine, a generator, and a gearbox. The gearbox can be disposed between the engine and generator, and can include at least two overrunning clutches. The first overrunning clutch can be operatively coupled to the engine, and can engage and/or disengage a shaft coupled to the generator. The second overrunning clutch can be at least partially fixed to the first overrunning clutch, and can engage and/or disengage the shaft. The gearbox can provide a relatively lower gear ratio when the engine drives the generator, and can provide a relatively higher gear ratio when the generator drives the engine.

DETAILED DESCRIPTION

Example energy capture devices and systems can be installed on any machine that includes an electric drive. It should be noted that the methods and systems described herein can be adapted to a large variety of machines. The machine can be an "over-the-road" vehicle such as a truck used in transportation or can be any other type of machine that performs some type of operation associated with an industry such as mining, construction, farming, transportation, or any other industry known in the art. For example, the machine can be an off-highway truck, earth-moving machine, such as a wheel loader, excavator, dump truck, backhoe, motor grader, material handler or the like. The term "machine" can also refer to stationary equipment like a generator that is driven by an internal combustion engine to generate electricity.

It should be noted that the Figures are illustrative only and they are not drawn to scale.

Figure 1:
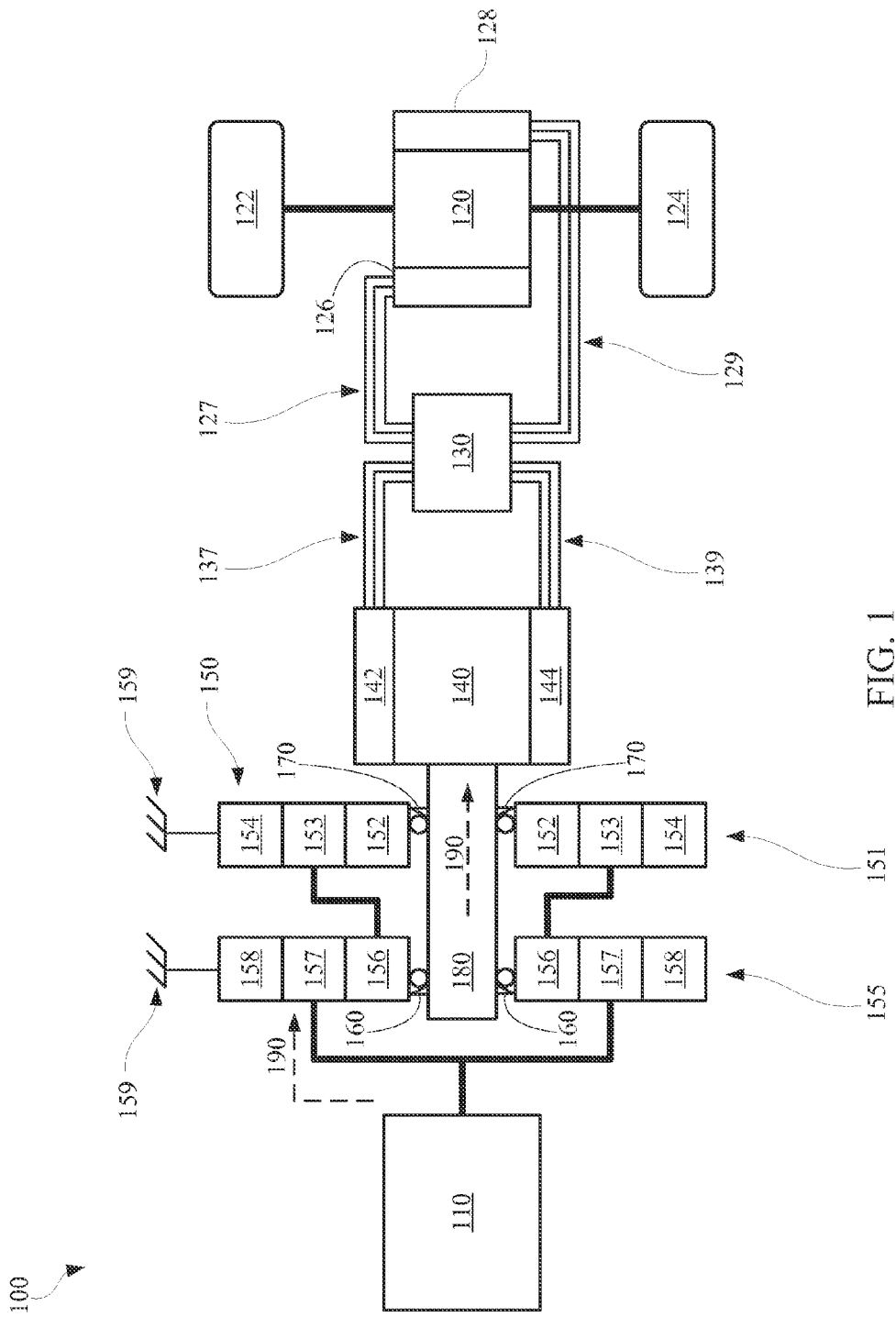
FIG. 1 is a schematic view of an example electric drive machine, in accordance with at least one embodiment of the present disclosure.

FIG. 1 is a schematic view of an example electric drive machine 100 (e.g., internal combustion engine), in accordance with at least one embodiment of the present disclosure. Machine 100 can include an engine 110, a motor 120 coupled to ground engaging devices 122, 124, a power convertor 130, a generator 140, and a gearbox.

Engine 110 can produce power, which can be transferred toward the ground engaging devices 122, 124, to cause movement of the machine. Specifically, engine 110 can produce an output torque through gearbox to the generator 140 and power convertor 130, which in turn can convert the mechanical torque into electrical power. The electrical power can then be used to drive motor 120 and ground engaging devices 122, 124, as is known in the art.

Machine 100 can include a motor 120 that operatively engages with a first ground engaging device 122 and a second ground engaging device 124. First and second ground engaging devices 122, 124 can be, for example, tracks, belts, wheels, or any other ground engaging device readily apparent to one skilled in the art.

Electronic components 126, 128 of motor 120 can be electrically coupled to power convertor 130 via wiring 127, 129. Power convertor 130 can be electrically coupled to electronic components 142, 144 of generator 140 via wiring 137, 139. Generator 140 can be mechanically coupled to gearbox 150 via shaft 180. Gearbox can also be mechanically coupled to engine 110 via shaft 180.

Gearbox can include overrunning clutches 151, 155. Overrunning clutches 151, 155 can be selectively locked and unlocked to engage and disengage shaft 180, respectively.

Overrunning clutches 151, 155 can be planetary gear assemblies. Each planetary gear assembly 151, 155 can include concentric gears rotatably supported and aligned along a rotational axis that is coaxial with shaft 180. Specifically, each planetary gear assembly 151, 155 can include a sun gear 152, 156, a carrier gear 153, 157, and a ring gear 154, 158. The carrier gear 153, 157 can mesh with the sun gear 152, 156 and the ring gear 154, 158. The sun gear 152, 156 and carrier gear 153, 157 can all rotate together simultaneously. Alternatively, any of the sun gear 152, 156, carrier gear 153, 157, and ring gear 154, 158 can be held stationary. In some examples, ring gear 154, 158 is always held stationary. In some examples, each planetary gear assembly 151, 155 can be grounded via a ground 159.

Each planetary gear assembly 151, 155 can receive input rotations and generate corresponding output rotations. The change in rotational speed between the input rotations and the output rotations can depend upon the number of teeth in the sun gear 152, 156 and the ring gear 154, 158. The change in rotational speed can also depend upon the gear(s) that is used to receive the input rotation, the gear(s) that is selected to provide the output rotation, and which gear, if any, is held stationary.

In some examples, each planetary gear assembly 151, 155 can have a gear ratio. For example, planetary gear assembly 151 can have a 2:1 gear ratio and planetary gear assembly 155 can have a 2.5:1 gear ratio. Any known gear ratios can be utilized.

FIG. 1 depicts a traction stage in which engine 110 drives generator 140 (this is schematically depicted by arrows 190). A traction stage can include activities in which the machine is moving forward or backward, for example. In this manner, engine 110 produces mechanical power that is transferred through planetary gear assembly 155 to generator 140 via the shaft 180 through overrunning clutch 160. In some examples, such as that show in FIG. 1, engine 110 is directly coupled to carrier ring 157 of planetary gear assembly 155. Sun ring 156 of planetary gear assembly 155 is fixed to carrier ring 153 of planetary gear assembly 151. Sun gear 152 of planetary gear assembly 151 overruns over the shaft via overrunning clutch 170. Thus, in the traction stage, overrunning clutch 160 can be locked or engaged with shaft 180, and overrunning clutch 170 can be unlocked or disengaged from shaft 180.

In this example, planetary gear assembly 155 has a gear ratio of 2.5:1 and planetary gear assembly 151 has a gear ratio of 2:1. In this manner, locked planetary gear assembly's 155 gear ratio of 2.5:1 allows the rotational speed (e.g., revolutions per minute) produced by engine 110 to be sped up by a 2.5:1 factor. In some examples, gear ratios of planetary gear assemblies 155, 151 may each generally be between 1:1 and 4:1. In some examples, gear ratios of planetary gear assemblies 155, 151 may each generally be between 2:1 and 4:1. In some examples, gear ratios of planetary gear assemblies 155, 151 may each generally be between 2:1 and 3:1.

During a traction stage (as depicted in FIG. 1), engine 110 drives generator 140. Engine 150 may be operating at 2,000 revolutions per minute (RPM), for example. Carrier ring 157 of planetary gear assembly 155 is also operating at 2,000 RPM because carrier ring 157 is directly coupled to engine 110. Ring gear 158 is held stationary. Because planetary gear assembly 155 has a gear ratio of 2.5:1 in this example, sun ring 156 of planetary gear assembly 155 operates at 5,000 RPM (i.e., 2,000 RPM×2.5). Sun ring 156 of planetary gear assembly 155 is fixed to carrier ring 153 of planetary gear assembly 151, and, therefore, carrier ring 153 operates at the same speed as sun ring 156 (i.e., 5,000 RPM). Ring gear 154 is held stationary. Because planetary gear assembly 151 has a gear ratio of 2:1 in this example, sun ring 152 of planetary gear assembly 151 operates at 10,000 RPM (i.e., 5,000 RPM× 2). In the traction stage, overrunning clutch 160 is locked to (i.e., engaged with) shaft 180 and overrunning clutch 170 is unlocked from (i.e. disengaged from) shaft 180. In this manner, generator 140 operates at the same speed as shaft 180 (i.e., 10,000 RPM).

Figure 2:
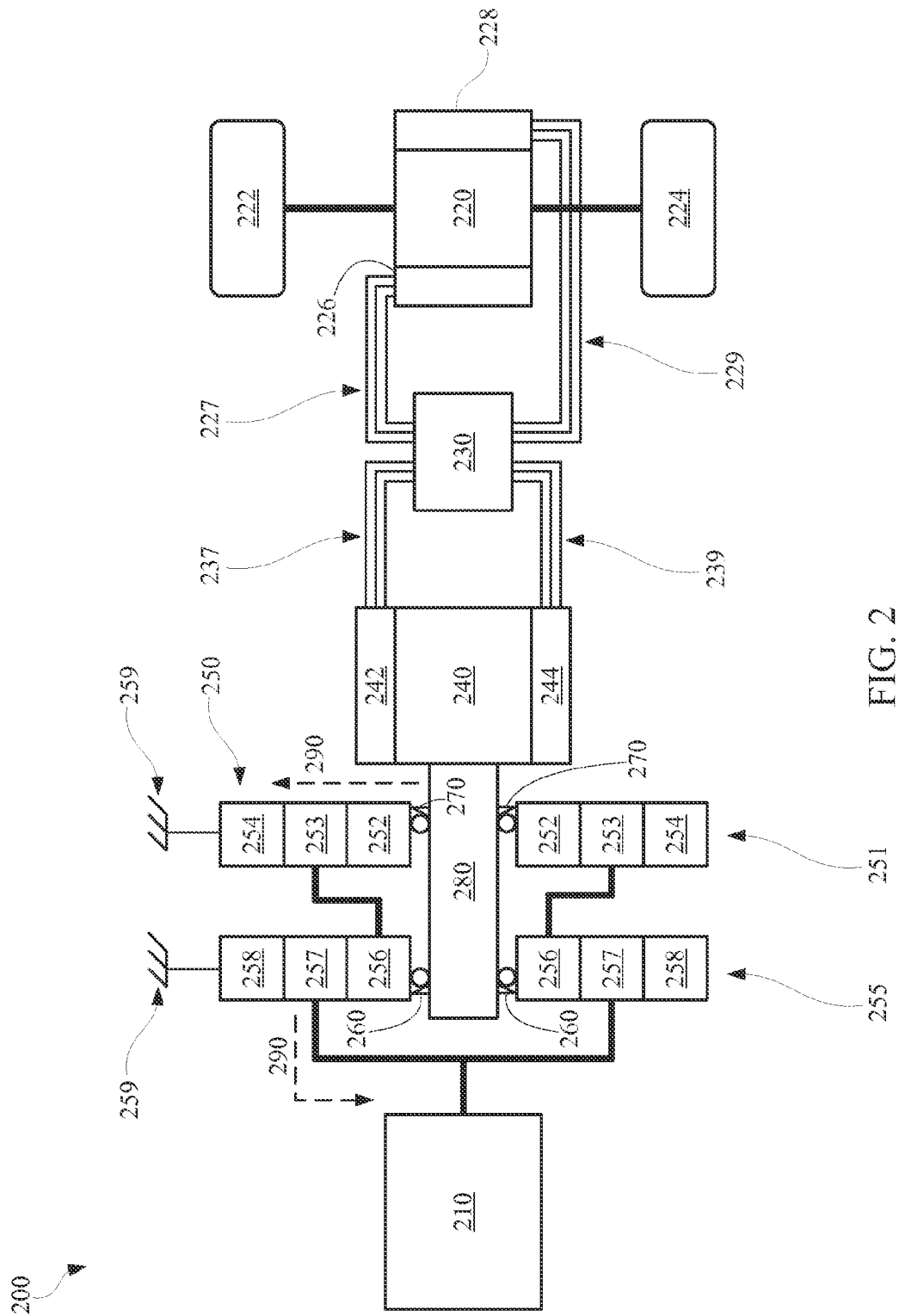
FIG. 2 is another schematic view of the example electric drive machine of FIG. 1, in accordance with at least one embodiment of the present disclosure.

FIG. 2 is a schematic view of an example electric drive machine 200, in accordance with at least one embodiment of the present disclosure. FIG. 2's components are numbered similarly to their counterparts in FIG. 2. Machine 200 can include an engine 210, a motor 220 coupled to ground engaging devices 222, 224, a power convertor 230, a generator 240, and a gearbox.

FIG. 2 depicts a braking stage in which generator 240 drives engine 210 (this is schematically depicted by arrows 290). A braking stage can include activities in which the machine is braking, for example. In this manner, motor 210 captures energy via braking of ground engaging devices 222, 224. This energy is transferred through power convertor 230 to generator 240. In some examples, engine 210 is directly coupled to carrier ring 257 of planetary gear assembly 255. Sun ring 256 of planetary gear assembly 255 is fixed to carrier ring 253 of planetary gear assembly 251. In the braking stage, planetary gear assembly 260 can be unlocked or disengaged from shaft 280, and overrunning clutch 270 can be locked or engaged with shaft 280.

In this example, planetary gear assembly 255 has a gear ratio of 2.5:1 and planetary gear assembly 251 has a gear ratio of 2:1. In this manner, locked planetary gear assembly's 251 gear ratio of 2:1 allows the rotational speed (e.g., revolutions per minute) produced by generator 240 to be sped up by a 2:1 factor. This allows the generator to act as a flywheel and increase the rotational speed for generating and storing power by a factor of two. In some examples, gear ratios of planetary gear assemblies 255, 251 may each generally be between 1:1 and 4:1. In some examples, gear ratios of planetary gear assemblies 255, 251 may each generally be between 2:1 and 4:1. In some examples, gear ratios of planetary gear assemblies 255, 251 may each generally be between 2:1 and 3:1.

During a braking stage (as depicted in FIG. 2), generator 240 drives engine 210. Generator 240 may be operating at 10,000 revolutions per minute (RPM), for example. Shaft 280 operates at the same speed as generator 240 (i.e., 10,000 RPM). In the braking stage, overrunning clutch 260 is unlocked from (i.e., disengaged froth) shaft 280 and overrunning clutch 270 is locked to (i.e., engaged with) shaft 280. Sun ring 252 of planetary gear assembly 251 also operates at 10,000 RPM. Ring gear 254 is held stationary. Because planetary gear assembly 251 has a gear ratio of 2:1 in this example, carrier ring 253 of planetary gear assembly 251 operates at 5,000 RPM (i.e., 10,000 RPM/2). Carrier ring 253 of planetary gear assembly 251 is fixed to sun ring 256 of planetary gear assembly 255, and, therefore, sun ring 256 operates at the same speed as carrier ring 253 (i.e., 5,000 RPM). Ring gear 258 is held stationary. Because planetary gear assembly 255 has a gear ratio of 2.5:1 this example, sun ring 256 of planetary gear assembly 255 operates at 2,000 RPM (i.e., 5,000 RPM/2.5). Carrier ring 257 of planetary gear assembly 255 is also operating at 2,000 RPM, and therefore, engine 210 also operates at 2,000 RPM.

INDUSTRIAL APPLICABILITY

The present disclosure is applicable to a variety of electrically driven machines in general (e.g., track-type tractors, skid steer loaders). The example described herein can be a cost effective way to capture and reuse energy in electric drive machines.

Electric drive machines produce a good amount of energy during braking. This energy can be harnessed to improve overall fuel efficiency of electric drive machines. The instant disclosure addresses this. Specifically, when the machine brakes, the mechanical energy from the tracks or wheels is partially converted into kinetic energy in the generator. Because the generator is coupled to the engine with a fixed gear ratio, the maximum engine speed limits the kinetic energy that can be stored in the rotor of the generator. The present disclosure provides a gear box with overrunning clutch between the engine and the generator. The mechanism provides a lower gear ratio when the engine drives the generator and a higher gear ratio when the generator drives the engine. This allows the generator to spin up to higher speeds and hence store higher kinetic energy while the machine is braking. This higher kinetic energy can be recovered and reused to improve the overall fuel efficiency of the machine and/or to power auxiliary systems of the machine.

It will be appreciated that the foregoing description provides examples of the disclosed systems and techniques. However, it is contemplated that other implementations of the disclosure can differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

I claim:

1. An energy capture device, comprising:
a first planetary gear assembly operatively coupled to an engine, the first planetary gear assembly adapted to engage and disengage, via a first overrunning clutch, a shaft coupled to a generator;
a second planetary gear assembly at least partially fixed to the first planetary gear assembly, the second planetary gear assembly adapted to engage and disengage, via a second overrunning clutch, the shaft;
wherein, during a first period, the first overrunning clutch disengages the shaft and the second overrunning clutch engages the shaft.

2. The device of claim 1, wherein the first planetary gear assembly comprises a first set of planetary gears.

3. The device of claim 2, wherein the first set of planetary gears includes a first sun gear, a first carrier gear, and a first ring gear.

4. The device of claim 1, wherein the first planetary gear assembly includes a 2.5:1 gear ratio.

5. The device of claim 1, wherein the second planetary gear assembly comprises a second set of planetary gears.

6. The device of claim 5, wherein the second set of planetary gears includes a second sun gear, a second carrier gear, and a second ring gear.

7. The device of claim 1, wherein the second planetary gear assembly includes a 2:1 gear ratio.

8. The device of claim 1,
wherein the first planetary gear assembly comprises a first set of planetary gears including a first sun gear, a first carrier gear, and a first ring gear;
wherein the second planetary gear assembly comprises a second set of planetary gears including a second sun gear, a second carrier gear, and a second ring gear; and
wherein the first sun gear is fixedly coupled to the second carrier gear.

9. The device of claim 1, wherein the first stage period comprises a braking stage.

10. An energy capture system, comprising:
a first set of planetary gears including a first sun gear, a first carrier gear, and a first ring gear, the first set of planetary gears adapted to selectively engage, via a first overrunning clutch, a shaft coupled to a generator;
a second set of planetary gears including a second sun gear, a second carrier gear, and a second ring gear, the second set of planetary gears adapted to selectively engage, via a second overrunning clutch, the shaft coupled to the generator;
wherein the first sun gear is fixedly coupled to the second carrier gear.

11. The system of claim 10, wherein the first sun gear and the first carrier gear rotate simultaneously.

12. The system of claim 10, wherein the first ring gear is stationary.

13. The system of claim 10, wherein the second sun gear and the second carrier gear rotate simultaneously.

14. The system of claim 10, wherein the second ring gear is stationary.

15. A machine, comprising:
an engine;
a generator; and
a gearbox disposed between the engine and the generator, the gearbox comprising:
a first planetary gear assembly operatively coupled to the engine, the first planetary gear assembly having a first overrunning clutch adapted to engage and disengage a shaft coupled to the generator; and
a second planetary gear assembly at least partially fixed to the first planetary gear assembly, the second planetary gear assembly having a second overrunning clutch adapted to engage and disengage the shaft;
wherein the gearbox provides a relatively lower gear ratio when the engine drives the generator, and wherein the gearbox provides a relatively higher gear ratio when the generator drives the engine.

16. The machine of claim 15, wherein the first planetary gear assembly comprises a first planetary gear assembly having a 2.5:1 gear ratio.

17. The machine of claim 15, wherein the second planetary gear assembly comprises a second planetary gear assembly having a 2:1 gear ratio.

18. The machine of claim 15, wherein the generator operates at a relatively higher revolutions per minute when the generator drives the engine compared to when the engine drives the generator.

19. The machine of claim 15, wherein the first overrunning clutch disengages the shaft and the second overrunning clutch engages the shaft when the generator drives the engine.

20. The machine of claim 15, wherein the first overrunning clutch engages the shaft and the second overrunning clutch disengages the shaft when the engine drives the generator.

\* \* \* \* \*